United States Patent [19]

Novorsky

[11] Patent Number: 4,759,808
[45] Date of Patent: Jul. 26, 1988

[54] METHOD FOR HARDENING CAM LOBES ON A CAMSHAFT

[75] Inventor: Donald E. Novorsky, Pleasant Ridge, Mich.

[73] Assignee: Tocco, Inc., Boaz, Ala.

[21] Appl. No.: 944,510

[22] Filed: Dec. 22, 1986

[51] Int. Cl.$^4$ ............................................. C21D 1/42
[52] U.S. Cl. .................................... 148/150; 148/154
[58] Field of Search ............... 148/150, 154, 145, 146, 148/152

[56] References Cited

U.S. PATENT DOCUMENTS 4,604,510 8/1986 Laughlin et al. ................. 219/10.43

FOREIGN PATENT DOCUMENTS

| 486651 | 1/1938 | United Kingdom | 266/129 |
| 533886 | 2/1941 | United Kingdom | 266/129 |
| 153924 | 8/1963 | U.S.S.R. | 266/129 |

OTHER PUBLICATIONS

SAE Techinical Paper entitled "Post Grind Hardening, an Alternative Method of Manufacturing a Steel Roller Camshaft", Series 860231 delivered Feb. 24–28, 1986.

Primary Examiner—Christopher W. Brody
Attorney, Agent, or Firm—Body, Vickers & Daniels

[57] ABSTRACT

A method and apparatus for inductively heating in an inductor and quench hardening the finished ground cam lobes of steel camshafts to a uniform shallow pattern depth with minimal lobe surface deformation. The inductor is shaped to correspond to the contour of and encircle the individual cam lobes with a minimal uniform induction coupling gap therebetween of less than 0.1 inch, and it is energized with high intensity power at a high frequency greater than 200 KHz, with sufficient power to create a power density of at least 25 KW/inch$^2$ at the surface of the cam lobe being heated in the inductor, for only a short heat time less than 1.0 second so as to effect the rapid inductive heating of the cam lobe surface to a uniform elevated temperature and uniform shallow depth therearound without causing unacceptable reheating and resultant drawing back or tempering of the previously hardened next adjacent cam lobe. The inductor is comprised of two complementary elongated copper segments which are normally interconnected at one end to form a conductor loop and conjointly provide a ring-shaped inductor element of the aforementioned contour for receiving the individual cam lobes in inductive heating position therein. The inductor segments are movable apart laterally outward from the camshaft a sufficient distance to permit both axial and rotative index movement of the camshaft relative to the inductor to position the other cam lobes of the camshaft individually in proper axial and rotative oriented position for encirclement and inductive heating by the inductor.

9 Claims, 5 Drawing Sheets

METHOD FOR HARDENING CAM LOBES ON A CAMSHAFT

The present invention relates, in general, to the art of induction heating and, more particularly, to a method and apparatus for hardening axially spaced cam lobes on a camshaft of the type used in internal combustion engines.

The invention is particularly applicable for inductively heating the axially spaced cam lobes on an automobile engine camshaft formed from forged steel and it will be described with particular reference thereto: however, the invention has much broader applications and may be used for inductively heating the axially spaced cam lobes on a variety of camshafts formed from various types of ferrous material.

BACKGROUND OF THE INVENTION

Recent trends in the design of passenger car engines make the use of steel camshafts advisable in engines equipped with roller type followers or valve lifters. The roller followers impose substantially higher compressive loads on the camshaft lobes. Accordingly, the uniformity of hardening of the cam lobes around their full peripheral extent is of utmost importance in order to resist lobe deformation and wear.

Heretofore, the manufacture of steel camshafts has generally entailed the formation of a forged steel blank which, after machining into general camshaft form, is hardened and then the cam lobes finished ground to precise surface profile. Such a steel camshaft manufacturing procedure, however, never attained any great degree of acceptance in the industry due to high manufacturing costs, low productivity levels, and the burning, cracking, and induced stresses caused by grinding the cam lobes to final shape after they have been hardened.

To overcome these problems, it has been recently proposed to produce steel camshafts by a so-called post grind hardening process wherein the cam lobes of the camshaft are first finished ground to their final surface profile, while the lobes are still in the soft or unhardened state, and the finished ground cam lobes then hardened to the requisite hardened depth. See SAE Technical Paper Series No. 860231 entitled "Post Grind Hardening, an Alternative Method of Manufacturing a Steel Roller Camshaft". Such a post grind hardening process, however, requires that the depth of hardening be kept to a minimum in order to ensure minimum heat distortion and maintain the accuracy of the finished ground cam lobes during the subsequent heating preparatory to hardening. For such reason, low heat input, short heat time, hardening methods for the cam lobes of the steel camshafts have been considered necessary by the industry.

Because of its relative simplicity as compared to other low heat input hardening methods such as electron beam and laser beam hardening, induction heating is generally preferred for the hardening of the cam lobes on steel camshafts. For this purpose, many in the industry have employed the prior induction heating devices which have been commonly used for hardening the cam lobes and also the fuel pump gear on cast iron type camshafts. Generally, the bearing surfaces of the conventional camshaft bearings have been left in an unhardened condition since they normally present a substantial bearing area for support by axially spaced bearing blocks.

The prior known induction heating and hardening devices conventionally employed for cast iron type camshafts have generally comprised an inductor in the form of a circular shaped heating coil within which the eccentrically contoured cam lobes of the camshaft are individually located, with the circular inductor encircling the cam lobe in closely spaced relation to form an inductive coupling gap therebetween which, because of the eccentric shape of the cam lobe, is of varying gap distance around the surface profile of the cam lobe. Energization of the inductor coil by a high frequency power supply of around 10 KHz and a relatively low power density at the cam lobe surface profile of, for instance, around 10 KW/inch$^2$ for a period of a few seconds then effects inductive heating of the cam lobe. Although ordinarily unnecessary for most purposes, the camshafts may be rotated if desired during the inductive heating cycle to assure a uniform inductive heating of and thus a uniform hardening of the cam lobe around its entire surface profile on subsequent quenching of the heated cam lobe by a liquid quench medium directed thereagainst.

The need for uniformity and depth of hardening of the cam lobes of roller follower actuating steel camshafts around their full peripheral extent and minimal lobe deformation and wear, together with the desirability of using low heat input, short heat time, hardening methods for the finish ground cam lobes in order to minimize the heat distortion or deformation of the cam lobe during the heating of the lobes for hardening, has led to the use of high power density, short heat time, induction heating of the cam lobes preparatory to the subsequent hardening thereof by quenching. However, such high power density induction heating of the camshafts by the previously known camshaft induction heating and hardening systems presented certain problems in attaining an overall uniformity of hardness in the surface profile of the cam lobes. Thus, because of the relative close spacing of the cam lobes to one another along the camshaft, the peripheral edges of adjacent cam lobes experience stray induction heating during the induction heating of a given cam lobe for hardening. Previously hardened cam lobes thus are subject to drawing back or tempering of their hardened condition, leading to an undesirable decrease in hardness and in the uniformity thereof. While the use of flux shields in other induction heating applications to limit the effects of stray induction heating is well known, their use in conjunction with the extremely close spaced cam lobes of engine camshafts adversely affects the flux field of the cam lobe being heated by the inductor such as then results in the nonuniform heating and consequent nonuniform hardening thereof.

A high power density induction heating and hardening system for the cam lobes of a camshaft which overcomes the above mentioned limitations and disadvantages is disclosed in U.S. Pat. No. 4,604,510, assigned to the same assignee as that of the present application. In the system disclosed in this patent, a cam lobe which has just been inductively heated and quench hardened in the circular shape induction heating coil is additionally quench cooled by a supplementary coolant, during the interval the next succeeding cam lobe is being heated and quench hardened in the inductor, in order to thereby prevent the reheating and resulting drawback or tempering of the previously hardened cam lobe by stray induction heating thereof. Movable shields are provided to engage around the camshaft body between the adjoining hardened and unhardened cam lobes, after the camshaft has been properly indexed to position the unhardened next cam lobe in the induction heating coil, to thereby intercept and prevent the supplementary quenching coolant directed against the previously hardened cam lobe from impinging against the surface of the adjacent unhardened cam lobe being heated in the heating coil. Otherwise, owing to the short heating cycle, the surface of the cam lobe being heated in the inductor will not attain the required elevated temperature and uniformity for the desired proper hardening thereof.

Although the cam lobe induction heating and hardening system as disclosed in the above referred to U.S. patent operates satisfactorily to produce steel camshafts having hardened cam lobes of requisite hardness and with an acceptable degree of uniformity therearound, the lobes nevertheless are still characterized by a certain small amount of surface profile distortion and also non-uniformity in the hardness pattern depth. This latter condition is due mainly to the eccentric shape of the cam lobe that forms an inductive coupling gap with the circular shaped induction heating coil of irregular gap width therearound. As a result, the cam lobes are apt to become heated to a varying degree and depth around their periphery during the inductive heating of the cam lobe in the inductive heating coil. Also, the requirement for the coolant shields and their timed actuating mechanism adds to the overall cost of the camshaft hardening apparatus.

SUMMARY OF THE INVENTION

The present invention contemplates a new and improved method and apparatus of simplified form for hardening the cam lobes of camshafts which overcomes the above referred to problems and others and produces post grind uniformly hardened cam lobes each having maximal uniform pattern depth and minimal distortion of their preground peripheral cam surfaces with no drawback tempering of previously hardened adjoining cam lobes.

Briefly stated, in accordance with a principal aspect of the invention, the unhardened cam lobes of a camshaft which have been first ground to their final lobe shape, are individually inductively heated, preparatory to subsequent hardening, within an inductor shaped to correspond to the contour of and encircle the respective cam lobe with a uniform minimal coupling gap therebetween. The encircling inductor is then energized with very high frequency power to produce a very high power density induction heating of the respective lobe throughout a very short heat cycle whereby rapid, shallow depth heating of the cam lobe to a predetermined uniform elevated temperature uniformly therearound is produced without stray inductive heating of the previously hardened adjacent cam lobe such as would cause undesired drawback tempering thereof, and with minimal heat induced grain growth of the heated cam lobe and resulting minimal distortion of the previously ground cam lobe surface profile. The heated cam lobe at the predetermined uniform elevated hardening temperature is then suitably quench hardened, preferably by the mass quenching thereof by the core material of the cam lobe behind the heated lobe surface, to produce a hardened cam lobe having a uniformly hardened surface profile of uniform hardened depth and accurate profile so that post grinding is not required.

In accordance with another aspect of the invention, the heated cam lobe, while at the predetermined elevated temperature within the inductor, may be immediately quench hardened by directing a polymer quench fluid against the heated cam surfaces of the cam lobe through the encircling inductor element.

In accordance with a further aspect of the invention, the inductor is shaped to encircle individual cam lobes with a minimal uniform induction coupling gap therebetween of less than 0.1 inch around the full circumferential extent of the cam lobe, and it is energized with high intensity power at a very high frequency greater than 200 KHz, with sufficient power to create a power density of at least 25 KW/inch$^2$ at the surface of the cam lobe being heated in the inductor, for only a very short heat time cycle less than 1.0 seconds, so as to effect the rapid inductive heating of the cam lobe surface to a uniform elevated temperature and a uniform shallow depth, without causing stray inductive heating of the previously hardened adjacent cam lobe and resulting undesirable drawback tempering thereof.

According to still another aspect of the invention, the inductor is comprised of two complementary elongated copper segments which are normally interconnected at one end by a disconnectable pressure electrical connector to form a single conductor loop and conjointly provide a ring-shaped inductor element shaped to correspond to the contour of and receive therein the individual cam lobes in corresponding rotative oriented position about the camshaft axis with a minimal uniform induction coupling gap therebetween of less than 0.1 inch around the full circumferential extent of the cam lobe. The inductor segments are separable and movable apart laterally outward from the camshaft, on disconnection of their pressure connection, to permit both axial and rotative index movement of the camshaft relative to the inductor to position the other cam lobes of the camshaft individually in proper axial and rotative oriented position for encirclement and inductive heating by the inductor on closure together and reconnection of the inductor segments thereof at their pressure connectable ends.

In accordance with a still further aspect of the invention, the separable inductor segments are mounted for pivotal movement about a common pivot axis parallel to and removed some distance from the camshaft axis on the opposite side thereof from the pressure connection of the inductor segments, to permit the above referred to axial and rotative index movements of the camshaft relative to the inductor.

The principal object of the invention is to provide a method and apparatus for hardening the cam lobes of a camshaft without tempering of previously hardened cam lobes thereof.

Another object of the invention is to provide a method and apparatus for heat treating camshafts to form the cam lobes thereof with uniformly hardened, accurately shaped, surface profiles and a uniform hardened pattern depth therearound.

Still another object of the invention is to provide a method and apparatus for post grind heat treating and hardening of the cam lobes of steel camshafts which minimizes heat induced deformation of the finish ground cam lobes to maintain the accuracy of their surface profiles.

A further object of the invention is to provide a method and apparatus for inductively heating and hardening the cam lobes on a camshaft which obviates the need for directing fluid coolant against a previously hardened cam lobe thereon to prevent stray induction heating and tempering thereof during the induction heating of the unhardened adjacent cam lobe preparatory to quench hardening.

A still further object of the invention is to provide a camshaft induction heating device which, while corresponding in shape to the contour of and adapted to closely encircle the individual camshaft lobes in corresponding rotatively oriented heating relation therewith about the camshaft axis and with a uniform minimal coupling gap therebetween, is nevertheless selectively convertible to a clearance condition allowing both axial and rotative movement of the camshaft with respect to the inductor.

Further objects and advantages of the invention will be apparent from the following detailed description of preferred species thereof and from the accompanying drawings.

DESCRIPTION OF THE PREFERRED EMBODIMENT

Figure 1:
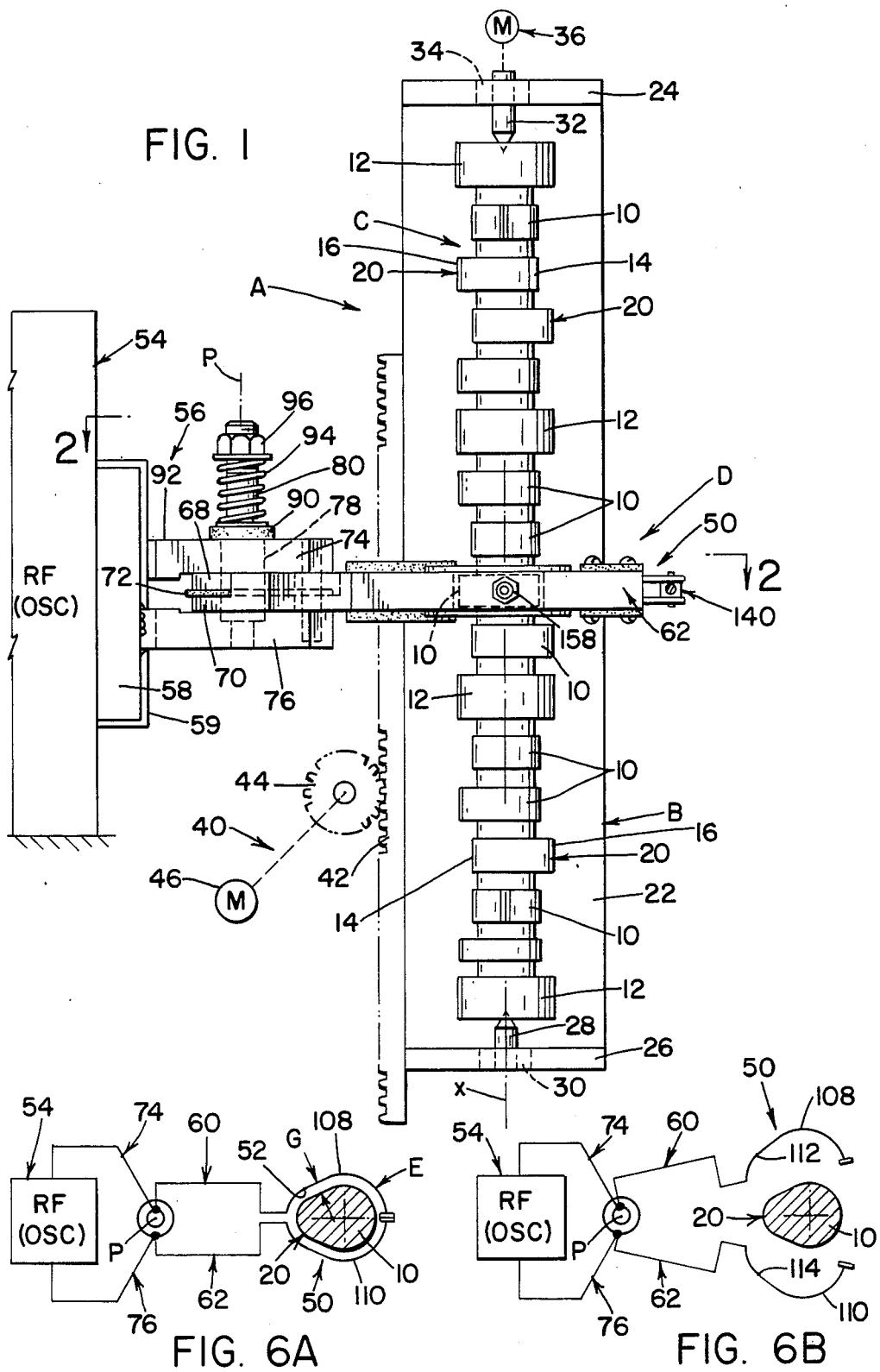
FIG. 1 is an elevational view of a camshaft heat treating apparatus in accordance with the invention.

Referring now to the drawings wherein the showings are for the purpose of illustrating a preferred embodiment of the invention only and not for the purpose of limiting same, FIG. 1 illustrates a camshaft heat treating apparatus A for heat treating and hardening the various cam lobes 10 on a forged steel camshaft C of the type used in internal combustion engines. The camshaft C includes a longitudinal extending axis of rotation x and it is formed with a plurality, four in the particular case illustrated, of generally equally axially spaced bearings 12 coaxial with the camshaft axis x and between which various groups of the cam lobes 10 are located. The cam lobes 10 are of like i.e., identical eccentrically contoured shape about the camshaft axis x, with each cam lobe having a generally semi-circular shaped heel portion 14 centered on the axis x and a rounded nose portion 16 which extends outwardly from the camshaft in a radial direction oppositely away from the heel portion 14 and joined thereto by connecting ramp portions 18. The various cam lobes 10 are axially spaced in different circumferentially oriented locations on the camshaft C and are formed with uniformly alike outer peripheral surface profiles 20 for controlling the reciprocation of the valve actuating followers of a motor vehicle engine.

The apparatus A generally comprises a support frame B adapted to support a camshaft C for rotational movement about its axis x and also axial index movement, and an induction heating and quenching device D for inductively heating the cam lobes 10 of the supported camshaft individually to a preselected elevated temperature preparatory to the quench hardening thereof in the device.

The support frame B includes, in the particular form of the invention illustrated, a vertical rectangular metal base plate member 22 provided at its opposite ends with opposed parallel projecting flanges 24, 26 vertically spaced apart a distance greater than the length of the camshaft C. The lower flange 26 rotatably supports a fixed datum center or camshaft lower end support 28 in a bearing 30 coaxially with the camshaft axis x. The upper flange 24 rotatably supports a live center or camshaft upper end support 32 in a bearing 34 coaxially with the axis x. The live center 32 is axially movable on the frame B relative to the lower center 28 by suitable means (not shown) between the illustrated operative position engaging and centering the upper end of the camshaft C and an upper retracted position which permits loading and unloading of the camshaft from the support frame B. The live center 32 is operatively connected to a control motor 36 for rotatively moving or indexing the loaded camshaft about the axis x thereof, as described in greater detail below.

The support frame B is connected to a vertical rack and pinion drive 40. The drive 40 comprises a vertically extending rack 42, a pinion 44 engaged with the rack for moving it vertically, and a control motor 46 for rotating the pinion 44 to drive the rack up or down. The rack 42 is attached in a vertically extending position to one side edge of the base plate member 22. The motor 46 is mounted on fixed support structure (not shown) and is operatively connected to the pinion 44 to rotate it. The teeth of the pinion 44 drivingly engage the teeth of the rack 42. Selective energization of the motor 46, as described in greater detail below, rotates the pinion 44 to vertically drive the rack 42 and associated support frame B with respect thereto. The support frame B is vertically slidably supported relative to a fixed structure by suitable conventional guide means (not shown). While shown vertically oriented, the apparatus A is also suitable for operation in other orientations including the horizontal.

The induction heating device or assembly D comprises a double segment inductor 50 normally in the form of a single conductor loop with a cam lobe encircling oval shaped inner surface 52 contoured to substantially correspond to the eccentrically shaped identical surface profiles 20 of the cam lobes 10 and adapted to receive the cam lobes one by one in inductive heating position therein in the same rotatively oriented position about the camshaft axis x as the inductor 50, with a uniform minimal induction coupling gap G (FIG. 3) therebetween of less than 0.1 inch. The inductor 50 is electrically connected to and supported in place from a high frequency power supply 54 by a rigid conductor lead assembly 56 extending therefrom and including a pair of vertically extending rigid conductor leads or bus bar members 57 and 58 supported on the power supply 54 in side-by-side relation and insulated from one another by a plastic insulator sheet 59.

The inductor 50 is comprised of a pair of complementary elongated segments 60 and 62 formed of copper and having respective body portions 64 and 66 of generally rectangular shaped plate-like form and respective fishtail end portions 68 and 70 extending endwise from the body portions at one end thereof. The inductor segments 60, 62 are supported at their fishtail ends 68, 70 by the conductor assembly 56 with their body portions 64, 66 disposed in a common horizontal plane and normally positioned alongside one another, and with their fishtail ends overlapping but electrically insulated from one another by a plastic insulator sheet 72 interposed therebetween The fishtail ends 68, 70 of segments 60, 62 extend one above the other and are clamped along with the insulator spacer sheet 72 between a pair of rigid conductor leads or bus bars 74, 76 of the conductor lead assembly 56. The conductor leads 74, 76 are cantilever supported at one end on, and extend horizontally from the vertical conductor lead members 57 and 58 of the conductor lead assembly 56 in parallel, vertically spaced apart relation, and they are clamped in electrical contact with the respective fishtail ends 68, 70 of the segments 60, 62 to thereby support the inductor 50 in place and electrically connect the segments 60, 62 thereof to the power supply 54.

Figure 3:
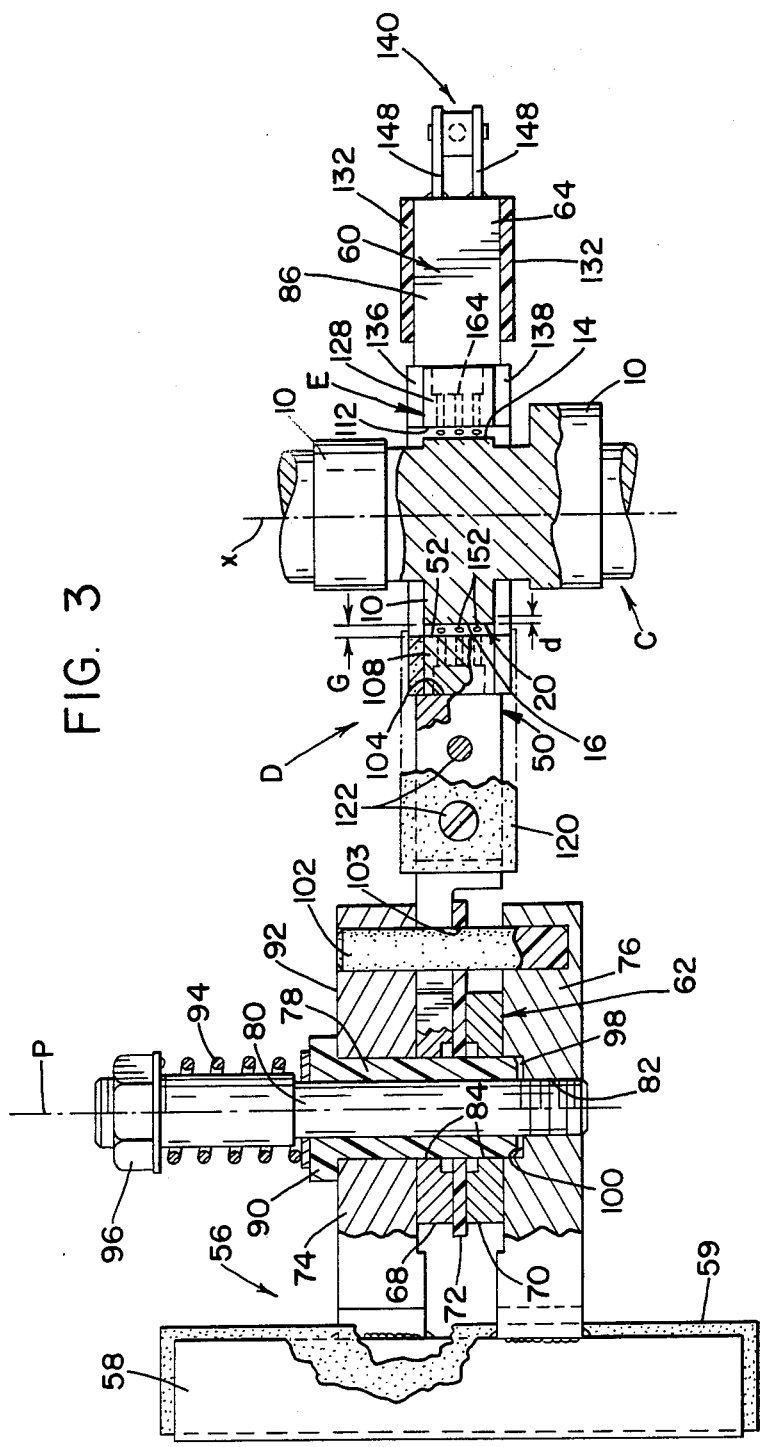
FIG. 3 is an elevational view partly broken away in section on the line 3—3 of FIG. 2.

The inductor segments 60, 62 of the inductor 50 are also supported at their fishtail ends 68, 70 by the conductor lead assembly 56 for pivotal swing movement thereon in a horizontal plane toward and away from one another. To this end, the fishtail ends 68, 70 of the inductor segments 60, 62 are pivotally interconnected, and pivotally mounted on the rigid conductor leads 74, 76, by a plastic insulator or pivot sleeve 78 fitted on a vertical pivot pin 80 extending through the conductor leads and fixedly secured at its lower end to the lowermost conductor lead 76 as by a screw thread engagement 82 therewith. The fishtail ends 68, 70 of the inductor segments 60, 62 are provided with circular bearing or bore openings 84 within which the pivot sleeve 78 is received to journal the inductor segments 60, 62 thereon for pivotal swing movement about the vertical pivot axis P of the pivot pin 80. As shown in FIG. 3, the vertical pivot axis P of the segments 60, 62 extends parallel to the cam shaft axis x and is spaced some distance from the cam lobe encircling surface 52 of the inductor 50. The pivot axis P also lies substantially in, but is offset a slight distance of around 1/32 inch or so outwardly from the planes of the vertically disposed, opposed straight edge surfaces 86 and 88 of the respective segments 60 and 62.

The plastic insulator sleeve 78 on which the inductor segments 60, 62 are pivoted is provided with an enlarged head end or outward flange 90 at its upper end for abutting against the upper surface 92 of the upper conductor lead 74 to seat the sleeve 78 in place therein. The two cantilever supported conductor leads or bus bars 74, 76 are urged toward one another with sufficient force to firmly clamp the fishtail ends 68, 70 of the segments 60, 62 between the conductor leads 74, 76, to establish and maintain good electrical contact therewith, by suitable clamping means, such as for example, a compression coil spring 94 slipped over an upwardly projecting end portion of the pivot pin 80 and compressed between the flange end 90 of the insulator sleeve 78 and a nut 96 fastened on the upper end of the pivot pin as by a screw threaded engagement therewith. A slight clearance 98 is provided between the lower end of the insulator sleeve 78 and the annular shoulder 100 of the sleeve receiving counterbore bearing opening in the lower conductor lead 76 in order to thereby allow the necessary clamping movement of the two cantilever mounted conductor leads 74, 76 toward one another and against the fishtails 68, 70 to assure their good electrical contact and connection therewith. A plastic retainer pin 102 mounted on and extending vertically between the two conductor leads 74, 76 and fitting through an opening 103 in the insulative separator sheet 72, at a location between the pivot pin 80 and the body portions 64, 66 of the inductor segments 60, 62 acts to maintain the separator sheet 72 fixed in place at all times in its fishtail insulating position, against any rotative displacement movement which might be otherwise caused by the repeated swing movements of the inductor segments 60, 62 during the normal usage of the apparatus A.

Figure 2:
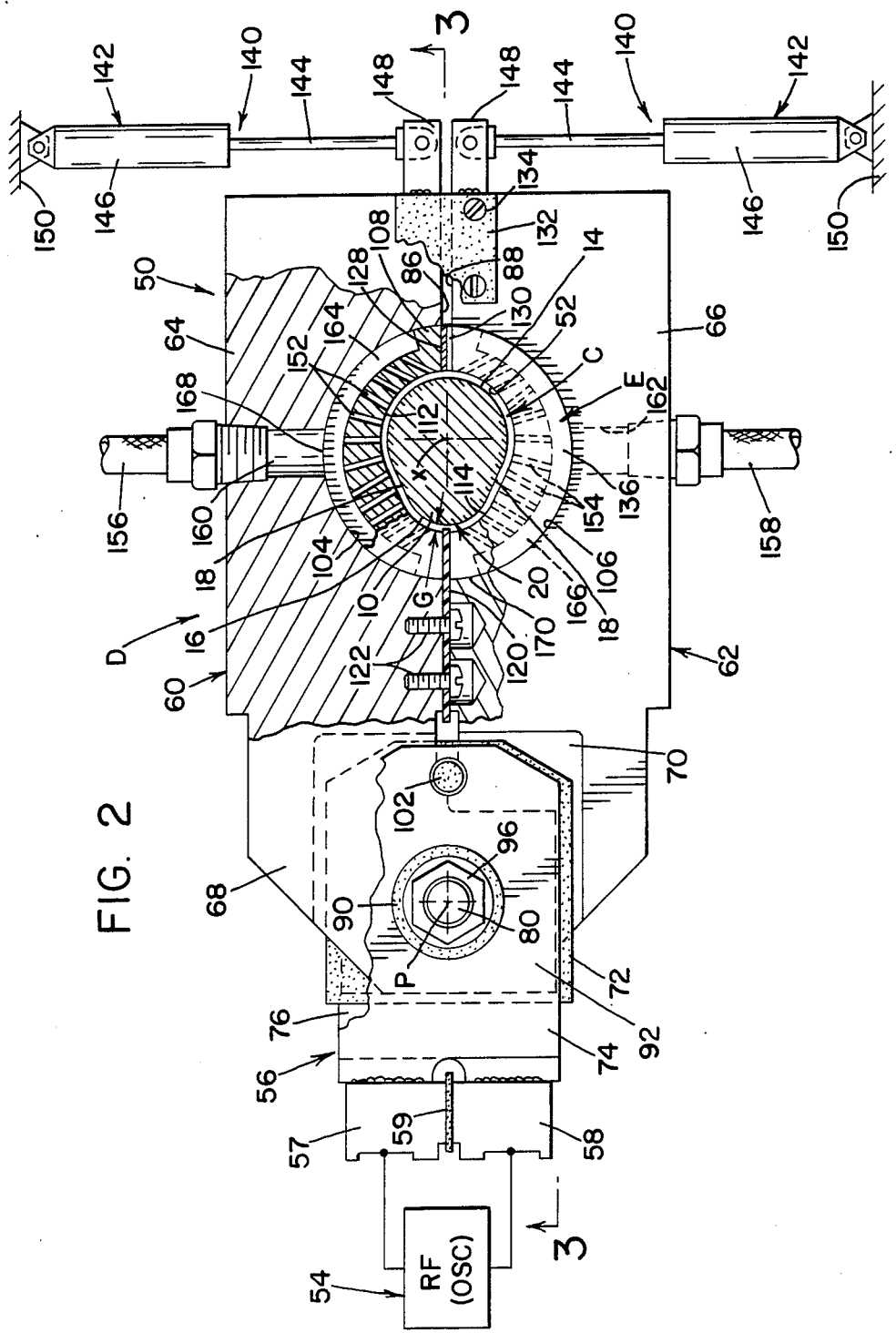
FIG. 2 is an enlarged plan view, partly broken away in section on the line 2—2 of FIG. 1, of the induction heating assembly of the apparatus shown in FIG. 1.

The complementary inductor segments 60, 62 are formed with semi-circular recesses 104 and 106 in their opposing longitudinal side edge surfaces 86, 88 within which respective half-ring shaped inductor heating element sections 108 and 110 of copper are seated and braised to conjointly form, when the inductor segments 60, 62 are pivoted to their closed operative position shown in FIG. 2, a composite ring-shaped induction heating element E. The half-ring shaped heating element sections 108 and 110 are formed with complementary half oval-shaped cam lobe accommodating recesses 112 and 114 in their respective diametrically extending edge surfaces 116 and 118. Recesses 112, 114 are symmetrically contoured to substantially correspond to, but be of slightly larger (i.e. less than 0.1 inch larger) dimensional size than the symmetrical halves of the oval shaped cam profile 20 which lie to each side of the diametrical plane thereof that bisects the heel and nose end portions 14 and 16 of the lobe profile 20. The contoured recesses 112, 114 of the heating element sections 108, 110 thus conjointly form, when the inductor segments 60, 62 are swung to their closed operative position, the aforementioned oval shaped cam lobe encircling inner surface 52 of the induction heating element E.

Figure 4:
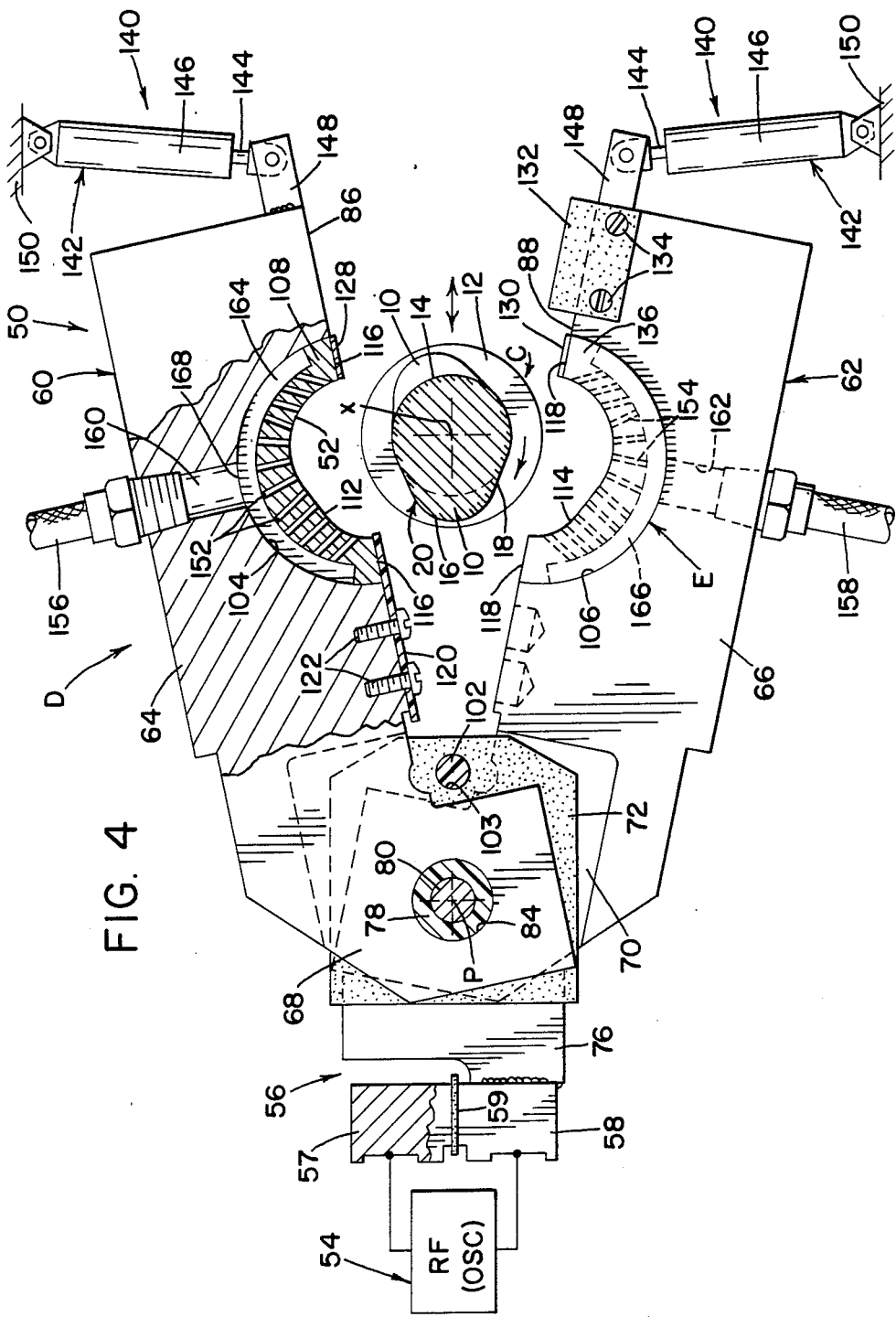
FIG. 4 is a plan view similar to FIG. 2 of the induction heating assembly but showing the inductor thereof in its opened position to allow axial movement of the camshaft therethrough.

As evident from FIG. 4, the edge surfaces 116 and 118 of the heating element sections 108, 110 form continuations of the straight edge surfaces 86 and 88 of the respective body portions 64 and 66 of the inductor segments 60, 62. An insulative separator sheet 120 of a heat resistant plastic material is suitably secured to the edge surface 86 of segment 60 adjacent the fishtail end 68 thereof, as by means of a pair of fastening screws 122, to maintain the segments 60, 62 and heating element sections 108, 110 separated a slight distance of around 1/16 inch or so and thus electrically isolated from one another at their respective facing edge surfaces 86, 88 and 116, 118, when the segments 60, 62 are swung to their closed, operative position shown in FIG. 2. Also, the opposed end surfaces 86 and 88 of the body portions 64, 66 of the inductor segments 60, 62, at the outward ends thereof opposite their fishtail ends, are likewise spaced a slight distance of around ⅛ inch or so from each other, when the inductor segments 60, 62 are swung to their closed operative position, to electrically isolate the body portions 64, 66 of the inductor segments at their outward ends. The opposed end faces 116 and 118 of the half-ring shaped inductor heating element sections 108, 110 which are located adjacent the outward ends of the segments 60, 62, are provided with relatively thin electrical contact pads 128 and 130 of silver, for instance. When the inductor segments 60, 62 are swung to their closed position, the contact pads 128, 130 are pressed into electrical contact with one another to form a pressure electrical connection of the half-ring heating element sections 108, 110 in series at one end to conjointly form a ring-shaped heating element E constituting the aforementioned single conductor loop having the cam lobe encircling inner surface 52.

Guide plates 132 of plastic insulating material are suitably secured as by fastening screws 134 to the flat upper and lower surfaces of inductor segment 62 at its free, unsupported outward end in a position overhanging the inward longitudinal edge 88 thereof. The guide plates 132 engage with the flat upper and lower surfaces of the other inductor segment 60, on swing movement of the two segments 60, 62 together into their closed position, to thereby guide the segments 60 and 62 into and hold them together in aligned position with one another at their outward ends.

Figure 5:
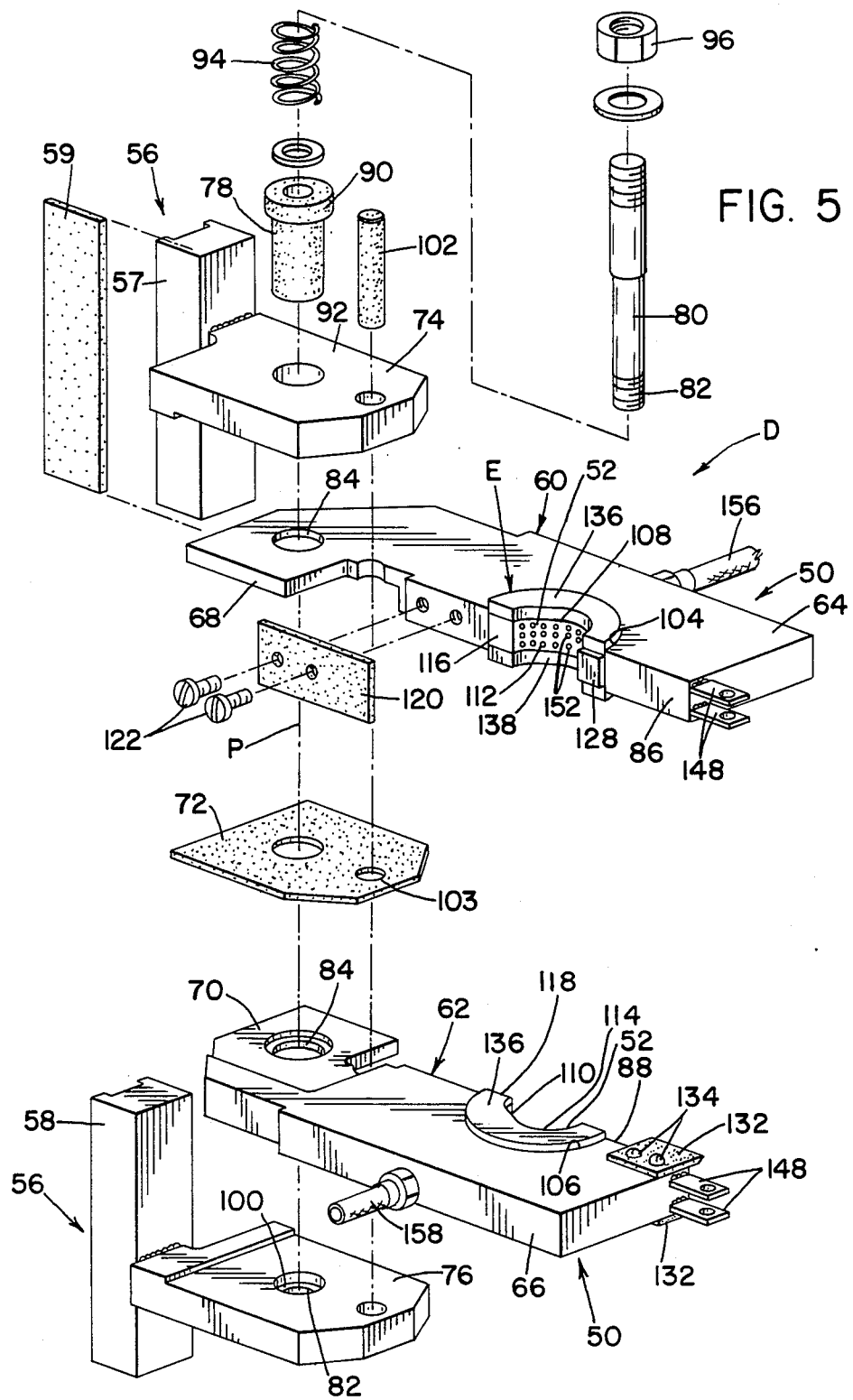
FIG. 5 is an exploded pictorial view of the induction heating assembly of the apparatus shown in FIG. 1; and, FIGS. 6A and 6B are schematic views diagrammatically illustrating the completed and interrupted modes, respectively, of the electrical energizing circuit for the inductor of the induction heating assembly.

As shown in FIGS. 3 and 5, the inductor 50 is provided with conventional flux intensifier means which, in the particular case illustrated, are in the form of upper and lower, half-ring shaped bands 136 and 138 of flat cross-section and made of FERROCON, which are fitted in place within the semi-circular shaped recesses 104 and 106 in the inductor segments 60 and 62 in positions overlying and underlying and engaging with the corresponding semi-circular shaped heating element sections 108 and 110 of the inductor 50 that are secured within the recesses 104, 106. During the induction heating of a cam lobe 10 by the inductor 50, the flux intensifiers 136 and 138 act to concentrate a considerably greater proportion of the heating flux generated by the energized inductor into the peripheral surface 20 of the cam lobe than would otherwise be the case, thereby affording more uniform and thorough as well as faster induction heating of the cam lobe surface 20 across its full width and around its peripheral extent to the selected elevated temperature for quench hardening.

Because of the close confinement of the individual cam lobes 10 within the lobe encircling inner surface 52 of the induction heating element E during the induction heating of each cam lobe therein, and also because of the different orientations of the cam lobes 10 on a given camshaft C about the axis x thereof, it is necessary to move the inductor segments 60, 62 a sufficient distance laterally apart at the conclusion of each cam lobe heating and hardening cycle to permit the required axial and rotative index movements of the camshaft C relative to the inductor 50 in order to locate an as yet unhardened cam lobe 10 of the camshaft in proper axial and rotative oriented position relative to the inductor 50 for subsequent encirclement and inductive heating thereby. To this end, the apparatus A is provided with suitable actuating means 140 for pivotally swinging the inductor segments 60, 62 laterally apart about their pivot axis P, upon completion of a cam lobe heating and hardening cycle, to an opened position as shown in FIG. 4. The particular actuating means 140 illustrated for this purpose may comprise a pair of pneumatic or hydraulic cylinders 142, the piston rods 144 and cylinders 146 of which are respectively pivotally connected, at the distal ends of the cylinders 142, to projecting ears 148 on the respective inductor segment 60 or 62 and to a respective stationary portion 150 of the apparatus frame (not shown) for pivotal movement of the cylinders 142 in a horizontal plane to accommodate the swing movements of the inductor segments 60, 62.

In the induction heating and hardening of an unhardened cam lobe 10 on a camshaft C by using the method and apparatus according to the invention, the cam lobe, after positioning thereof within and encirclement by the induction heating element E of the inductor 50 as shown in FIG. 3, with the contoured inner surface 52 of the induction heating element E spaced a uniform minimal induction coupling gap distance G of less than 0.1 inch from the peripheral surface profile 20 of the encircled cam lobe, is then inductively heated by the energization of the inductor 50 with electrical power from the high frequency power supply 54. In accordance with the invention, the inductive heating of the cam lobe 10 by the inductor 50 is carried out by energizing the inductor from power supply 54 with high intensity radio frequency power having a frequency greater than 200 KHz and as high as 450 KHz, and producing a high intensity power density of at least 25 KW/inch$^2$ at the surface profile 20 of the cam lobe 10. Such high intensity, high frequency induction heating of the cam lobe 10 by the inductor 50 thus effects the heating of the surface profile 20 of the cam lobe uniformly therearound to the selected elevated temperature and to a uniform depth, preparatory to quench hardening, in a very short heat time of less than 1.0 second and as little as 0.3 seconds, i.e. substantially instantaneously, thereby minimizing heat distortion of the grain structure and consequent distortion of the surface profile of the peripheral surface 20 of the cam lobe. As a result, the accuracy of the preground cam lobe surface profile 20 is maintained during the post grind heating of the cam lobe in the manner according to the invention to the preselected elevated temperature for quench hardening. Also, because of the uniform coupling gap G which exists between the peripheral surface 20 of the cam lobe 10 and the correspondingly contoured encircling inductor element E, during the induction heating of the cam lobe in accordance with the invention to the preselected elevated temperature for quench hardening, the cam lobe periphery 20 therefore is uniformly inductively heated to a uniform temperature and depth therearound by the inductor 50 and, as a result, is uniformly hardened to a very uniform pattern depth on ensuing quench hardening.

On completion of the induction heating cycle of the inductor 50 to effect the induction heating of the cam lobe surface 20 to the preselected elevated heat treating temperature, the supply of power to the inductor 50 from power supply 54 is discontinued and the heated cam lobe 10 then immediately quench hardened in a suitable manner, preferably by a so-called mass quench thereof by the core material of the cam lobe which lies behind or under the heated peripheral surface 20 of the cam lobe. A hardened cam lobe 10 is thereby produced having a uniformly hardened periphery of accurate surface profile substantially corresponding to the initial finish ground surface profile thereof and of very uniform hardened pattern depth so that post hardened regrinding of the cam lobe is unnecessary. The mass quench and hardening of the heated cam lobe 10 immediately on attaining the selected elevated temperature in the inductor 50 may be carried out either while the heated cam lobe still remains in place within the inductor 50, or during an ensuing time interval while the heated cam lobe is axially indexed out of the inductor and located at the next adjacent indexed position thereof along the camshaft axis x, during which time interval the as yet unhardened next cam lobe 10 on the camshaft is indexed into the inductor 50 for inductive heating therein.

The heating of the cam lobes 10 to the selected elevated heat treating temperature by the high intensity, ultra-high frequency inductive heating method according to the invention, using an inductor 50 correspondingly contoured to and closely encircling the surface profile 20 of the cam lobes 10, assures that substantially all of the flux generated by the energized inductor will be concentrated in the cam lobe encircled by the inductor, thereby avoiding stray flux heating and attendant drawback tempering of the previously hardened adjacent cam lobe. As a consequence, with the induction heating method and apparatus according to the invention, there is no need for employing a supplementary cooling means as disclosed in the aforementioned U.S. Pat. No. 4,604,510 for directing fluid coolant against the previously hardened adjacent cam lobe 10 during the induction heating of an unhardened cam lobe in the inductor 50, to provide sufficient cooling of such previously hardened cam lobe to prevent a temperature rise therein into the tempering range of the camshaft material due to the stray flux heating of the hardened adjacent cam lobe. Nor is there any need for employing the laterally movable shield plates as disclosed in U.S. Pat. No. 4,604,510 for movement laterally inward between the inductor 50 and any such supplementary cooling means in order to shield and prevent fluid coolant from the supplementary cooling means from impinging against the unhardened cam lobe being heated in the inductor and thereby preventing it from attaining the required elevated temperature for hardening. It will be evident, therefore, that the cam lobe post grind heating and hardening method and apparatus according to the invention not only provides a greatly simplified and less expensive way of accomplishing this object as compared to prior known methods and apparatus, but also results in a uniformly case hardened cam lobe of very uniform hardness pattern depth d (FIG. 3) and minimal distortion of its finished ground cam profile 20.

In place of employing a mass quench of the inductively heated cam lobe 10 as described above to quench harden the peripheral surface 20 thereof, the heated cam lobe 10 may be quench hardened, on reaching the selected elevated temperature in the inductor 50, by immediately directing a spray of a suitable quench liquid such as a polyalkalene glycol and water solution against the heated peripheral surface 20 of the cam lobe 10. The quench liquid may be directed against the heated cam lobe surface 20 outwardly from a plurality of small dimension port openings 152 and 154 (FIG. 4) in the contoured surfaces forming the recesses 112 and 114 in the inductor element sections 108 and 110. The spray of quench liquid from the port openings 152, 154 quenches and thus hardens the peripheral surface 20 of the cam lobe. The quench liquid is supplied to the port openings 152, 154 from respective conduits 156 and 158 connected to a suitable supply (not shown) of the quench liquid and communicating, through respective passageways 160 and 162 in the inductor segments 60, 62, with respective arcuate extending manifold chambers 164 and 166 formed in the semi-circular outer surfaces 168 and 170 of the respective heating element sections 108 and 110.

In the use of the apparatus A to heat treat and case harden the peripheral surfaces of the various cam lobes 10 on a camshaft C in accordance with the method comprising the invention, the camshaft is loaded in vertically extending position between the centers 28 and 32 of the support frame B while the segments 60, 62 of the inductor 50 are in their swung apart open position as shown in FIG. 4. The camshaft C is then axially and rotatively adjusted, by operation of the vertical adjustment and rotative drive mechanisms 40 and 36, to successively locate each of the cam lobes 10 on the camshaft in proper axial and rotative oriented position relative to the inductor 50 for inductive heating of each cam lobe to the selected elevated heat treating temperature for quench hardening. On such positioning of each cam lobe 10 relative to the inductor 50 (FIG. 1), the inductor segments 60, 62 are swung together to their closed operative position as shown in FIG. 2 by the operation of their respective actuating means 140. The half-ring shaped heating element sections 108, 110 of the inductor 50 are thereby moved laterally together to electrically interconnect them at their engaged contact pads 128, 130 and conjointly form the ring-shaped induction heating element E encircling the peripheral surface 20 of the particular one cam lobe 10, with a uniform minimal induction coupling gap G therebetween of less than 0.1 inch.

With the inductor 50 thus closed around the cam lobe 10, the inductor is then energized by the aforementioned high intensity ultra-high frequency power supply 54 (i.e. greater than 200 KHz and as high as 450 KHz) for a very short heat time cycle less than 1.0 second and as short as around 0.3 seconds, to thereby effect the high intensity induction heating of the peripheral surface 20 of the cam lobe, with a power density thereat of at least 25 KW/inch$^2$, to the selected elevated heat treating temperature uniformly therearound and across the full width thereof and to a uniform shallow depth in the range of around 0.030 to 0.045 inch. At the end of the cam lobe heating cycle, the supply of power to the inductor 50 from the high frequency power supply 54 is discontinued to de-energize the inductor 50, whereupon the heated peripheral surface 20 of the cam lobe is immediately quench hardened in a suitable manner, preferably by a so-called mass quench thereof by the mass of the cam lobe material lying behind or under the heated peripheral surface 20 of the cam lobe. Alternatively, the heated peripheral surface 20 of the cam lobe may be quench hardened by directing thereagainst a spray of quench liquid from the port openings 152 and 154 in the heating element sections 108, 110 of the inductor 50. The resulting post grind hardened cam lobe 10 has a uniformly case hardened peripheral surface 20 of uniform hardness pattern depth d therearound and across its full width and characterized by minimal heat distortion of the preground cam profile 20 and a minimal amount of surface crown across its width.

After the quench hardening as described above of the inductively heated cam lobe surface 20, the two inductor segments 60, 62 are swung apart to their opened position as shown in FIG. 4 by the operation of their respective actuating means 140, whereupon the camshaft C is axially indexed vertically downward and rotatively indexed by the operation of the respective drive means 40 and 36, to position the as yet unhardened, next above cam lobe 10 of the camshaft in proper axial position along and rotative oriented position about the camshaft axis x for encirclement and induction heating by the inductor 50. The operation of the apparatus A as described above to inductively heat and quench harden the hardened cam lobe 10 is then repeated for the next adjacent and all the other unhardened cam lobes 10 on the camshaft C to thereby complete the case hardening of all the lobes thereon in accordance with the invention.

Inasmuch as the bearings 12 of the camshaft C are not subjected to any heat treatment in the inductor 50 but are left in an unhardened condition, they are simply moved, during the axial index movements of the camshaft, completely through the inductor 50 while the segments 60, 62 thereof are in their pivotally separated open position. At such time, the two inductor segments 60, 62 are laterally separated a sufficient distance to permit the free passage of the respective camshaft bearings 12 through the inductor 50 without obstruction therewith.

In place of the inductor 50 being formed, as shown, of two elongated complementary segments 60, 62 pivotally separable along a separation plane which includes their common pivot axis P, the inductor 50 may be constituted instead of other forms of separable inductor segments such as, for example, inductor segments which are mounted simply for rectilinear separation movement away from one another as by hydraulic actuating means similar to that illustrated at 140. Like inductor segments 60, 62, such rectilinearly separable inductor segments also would be provided with symmetrically contoured complementary half-ring shaped inductor heating element sections 108, 110 which, when the segments are rectilinearly closed together by the actuation means 140, would become electrically interconnected in series at a respective one of their ends, by a pressure electrical connection of silver contact pads 108, 110 on such heating element ends, to thereby conjointly form the ring-shaped induction heating element E constituting a single conductor loop.

Having described the invention the following is claimed:

1. A method of hardening a plurality of identically contoured cam lobes axially spaced in differing circumferentially oriented locations on a camshaft having a longitudinally extending rotation axis, said method comprising the steps of:
    (a) providing a fixedly positioned inductor having a conductor loop comprised of a pair of separable inductor segments movable together to conjointly form a ring-shaped inductive heating element having a central work axis and separable laterally therefrom, said heating element being countoured to substantially correspond to and encircle the surface profile of a single individual one only of the said identically contoured cam lobes with a uniform minimal induction coupling gap therebetween of less than 0.1 inch around the full peripheral extent of the cam surface profile;
    (b) positioning said camshaft in axial alignment with said work axis for axial index movement through said inductor;
    (c) indexing said camshaft axially with respect to said inductor, while the said segments thereof are laterally separated, to locate an individual one of said cam lobes in axial position for encirclement and inductive heating thereof by said inductor;
    (d) rotatively indexing said camshaft about its said rotation axis, while the said inductor segments thereof are laterally separated, to locate the said axially positioned one cam lobe in an oriented position about said work axis corresponding to that of the said contoured heating element of said fixedly positioned inductor;
    (e) moving the said inductor segments together to conjointly form the said ring-shaped heating element and encircle therewithin the said axially positioned and oriented one cam lobe with the said uniform minimal induction coupling gap therebetween;
    (f) energizing said inductor at a frequency greater than 200 KHz, and with a high intensity power density of at least 25 KW/inch$^2$ at the surface profile of the cam lobe positioned in said inductor, for a heating cycle of less than 1.0 second to inductively heat the said one cam lobe uniformly therearound to a predetermined heat treating temperature preparatory to subsequent quench hardening;
    (g) moving said inductor segments laterally outward from said work axis to separate them a distance permitting both axial and rotative movement of said camshaft with respect to said inductor;
    (h) repeating the said axial and rotative indexing of said camshaft relative to said inductor to move the said one cam lobe out of said inductor and index another one of said cam lobes into the said axial and oriented positions within the said inductor for inductive heating thereby; and,
    (i) then repeating the said steps of moving the said inductor segments back together to form the said ring-shaped heating element encircling said another one cam lobe, and energizing the said heating element to heat the said another cam lobe uniformly therearound to said predetermined heating temperature.

2. The method as defined in claim 1 including the additional step of directing a fluid quench medium from the inner surface of said inductive heating element onto the said heated cam lobes immediately followng the termination of each said heating cycle.

3. A mehtod of hardening a plurality of identically contoured finish ground cam lobes axially located in closely spaced relation and in differing circumferentially oriented positions on a camshaft having a longitudinally extending rotation axis, said method comprising the steps of:
    (a) surrounding each of said cam lobes in succession with a closed loop inductor having a lobe encircling inner face opposed to and encircling the surface profile of the individual cam lobes with a uniform induction coupling gap therebetween of less than 0.1 inch around the full peripheral extent of the cam surface profile;
    (b) energizing said inductor with high itensity radio frequency power at a frequency greater than 200 KHz and providing a high intensity power density of at least 25 KW/inch$^2$ at the surface profile of each respective one of said cam lobes while encircled by said inductor;
    (c) maintaining said inductor so energized for a momentary heat cycle time of less than 1.0 second to effect the substantially instantaneous induction heating o fthe surface profile of each respective one of said cam lobes, while encircled by said inductor, to a selected elevated heat treating temperature throughout a relatively shallow depth thereof and uniformly therearound preparatory to quench hardening, without causing either stray flux induction heating adjacent previously hardened one of said cam lobes or unacceptable heat distortion of the induction heated surface profile of said heated cam lobe; and,
    (d) then quenching the said heated surface profile of each respective one of said inductively heated cam lobes while at the said uniform heat treating temperatue to thereby harden the said heated surface profile uniformly therearound and to a uniform pattern depth.

4. The method as defined in claim 3, wherein the said quenching of the heated surface profile of each respective one of said heated cam lobes is effected by a mass quench of said heated surface profile by the mass of the unheated core material of said cam lobe lying behind the said heated surface profile thereof.

5. The method as defined in claim 3, wherein the said quenching of the heated surface profile of each respective one of said heated cam lobes is effected by directing a fluid quench medium from the said inner face of said inductor onto the said heated surface profile of each said cam lobe immediately following the termination of said heating cycle.

6. A method of hardening identically contoured, differently oriented, spaced cam lobes on a cam shaft comprising the steps of:
  (a) axially moving the camshaft along the rotating it about the axis thereof to index an individual one of the cam lobes thereon into a fixed heating position within, and oriented in the same angular position around the said axis as the oriented position therearound of, a stationary inductor having a ring-shaped induction heating element with a cam lobe encircling inner surface contoured to conform to and encircle the surface profile of the said indexed individual cam lobe with a uniform minimal coupling gap therebetween of less than 0.1 inch around the full peripheral extent of the cam lobe surface profile;
  (b) energizing the said inductor with high intensity radio frequency power at a frequency greater than 200 KHz and providing a high power density of at least 25 KW/inch$^2$ at the surface profile of the said indexed individual one cam lobe encircled by said inductor for a heating cycle of less than 1.0 second to inductively heat the cam lobe surface profile substantially instantaneously and uniformly therearound heat treating temperature for subsequent hardening; and,
  (c) then quenching the said heated cam lobe surface profile of said individual one cam lobe while at the said uniform heat treating temperature to thereby harden the said surface profile uniformly therearound and to a uniform pattern depth.

7. The method as defined in claim 6, wherein the said quenching of the heated surface profile of said heated individual one cam lobe is effected by a mass quench of said heated surface profile by the mass of the unheated core material of said one cam lobe underlying the said heated surface profile thereof.

8. The method as defined in claim 6, wherein the said quenching of the heated surface profile of said heated individual one cam lobe comprises the step of directing a fluid quench medium from the cam lobe encircling inner face of said induction heating element onto the said heated surface profile of said one cam lobe immediately following the termination of said heating cycle.

9. The method as defined in claim 6 including the additional steps of repeating the said axial movement and rotating of the said camshaft relative to said inductor to move the hardened said one cam lobe out of the inductor from its said fixed heating position therein and index an as yet unhardened another one of said cam lobes into said fixed heating position within the inductor and encircled by the said induction heating element thereof, and then repeating the said steps of energizing the said inductor to inductively heat the said another one cam lobe substantially instantaneously and uniformly therearound to said predetermined heat treating temperature, and quenching the said heated another one cam lobe while at the said heat treating temperature to thereby harden the said surface profile thereof.

* * * * *

UNITED STATES PATENT AND TRADEMARK OFFICE
CERTIFICATE OF CORRECTION

PATENT NO. : 4,759,808

DATED : July 26, 1988

INVENTOR(S) : Donald E. Novorsky

It is certified that error appears in the above-identified patent and that said Letters Patent is hereby corrected as shown below:

Column 7, line 8, after "therebetween" insert a period (.); line 39, "cam shaft" should read --- camshaft ---. Column 8, line 29, after "cam" insert "lobe". Column 14, line 55, "o fthe" should read --- of the ---; line 61, after "heating" insert "and drawback tempering of the surface profile of a next"; lines 67-68, "temperatue" should read --- temperature ---. Column 15, line 19, "the" (2nd occurrence) should read --- and ---. Column 16, lines 1-2, after "therearound" insert "to a predetermined ".

Signed and Sealed this

Twenty-seventh Day of February, 1990

Attest:

JEFFREY M. SAMUELS

*Attesting Officer*     *Acting Commissioner of Patents and Trademarks*